(12) United States Patent
Hickman MacCoy et al.

(10) Patent No.: US 9,562,793 B2
(45) Date of Patent: Feb. 7, 2017

(54) ILLUMINATION PORTION FOR AN OPTICAL ENCODER

(71) Applicant: Mitutoyo Corporation, Kanagawa-ken (JP)

(72) Inventors: Brynn Kristen Hickman MacCoy, Seattle, WA (US); Casey Edward Emtman, Kirkland, WA (US)

(73) Assignee: Mitutoyo Corporation, Kanagawa-ken (JP)

( * ) Notice: Subject to any disclaimer, the term of this patent is extended or adjusted under 35 U.S.C. 154(b) by 88 days.

(21) Appl. No.: 14/543,739

(22) Filed: Nov. 17, 2014

(65) Prior Publication Data
US 2016/0138945 A1 May 19, 2016

(51) Int. Cl.
G01D 5/34 (2006.01)
G01D 5/347 (2006.01)
G01D 5/38 (2006.01)

(52) U.S. Cl.
CPC ............ G01D 5/34715 (2013.01); G01D 5/38 (2013.01)

(58) Field of Classification Search
CPC .................................................. G01D 5/34715
USPC ..................... 250/231.13–231.18; 341/13, 14
See application file for complete search history.

(56) References Cited

U.S. PATENT DOCUMENTS

| 4,437,098 A * | 3/1984 | Rosinek .................. G06M 1/27 250/227.11 |
| 5,055,894 A | 10/1991 | Chan |
| 5,302,820 A | 4/1994 | Henshaw et al. |
| 7,417,218 B2 | 8/2008 | Yamamoto et al. |
| 7,608,813 B1 | 10/2009 | Milvich et al. |
| 7,719,075 B2 | 5/2010 | Speckbacher et al. |
| 2004/0173736 A1* | 9/2004 | Atsuta ................ G01D 5/34715 250/231.13 |
| 2010/0072456 A1 | 3/2010 | Weston et al. |
| 2010/0243871 A1 | 9/2010 | Hane |
| 2013/0161499 A1 | 6/2013 | Tobiason et al. |

FOREIGN PATENT DOCUMENTS

EP     2 244 071 A2    10/2010

OTHER PUBLICATIONS

Cowley et al., "Fourier Images: I—The Point Source," Proc. Phys. Soc. 70(5):486-496, 1957. (18 pages).
Crespo et al., "Optical encoder based on the Lau effect," Opt. Eng. 39(3):817-824, 2000.
Liu, "Partially coherent diffraction effect between Lau and Talbot effects," J. Opt. Soc. Am. A 5(l0):1709-1716, 1988.

* cited by examiner

*Primary Examiner* — Thanh Luu
(74) *Attorney, Agent, or Firm* — Seed Intellectual Property Law Group LLP

(57) ABSTRACT

An illumination portion for an optical encoder is disclosed. The optical encoder comprises the illumination portion, a scale grating extending along a measuring axis direction and arranged to receive light from the illumination portion, and a detector configuration arranged to receive light from the scale grating. The illumination portion comprises an addressable light source array. The addressable light source array comprises individual sources arranged along the measuring axis direction. The addressable light source array is configured to provide at least a first addressable set and a second addressable set of the individual sources.

18 Claims, 8 Drawing Sheets

ILLUMINATION PORTION FOR AN OPTICAL ENCODER

TECHNICAL FIELD

The present application relates generally to precision measurement instruments and more particularly to optical displacement encoders.

BACKGROUND

Various optical displacement encoders are known that use a readhead having an optical arrangement that images a scale pattern to a photodetector arrangement in the readhead. The image of the scale pattern displaces in tandem with a scale member, and the movement or position of the displaced scale pattern image is detected with a photodetector arrangement. Optical encoders may utilize a self-imaging arrangement in order to detect a displacement of a scale member comprising a scale grating. The basic principle of self-images, also known as Talbot images, is described in the paper "Fourier Images: I—The Point Source" by Cowley, J. M., and A. F. Moodie, 1957, Proc. Phys. Soc. B, 70, 486, which is incorporated herein by reference. An exemplary optical encoder utilizing self-imaging is disclosed in U.S. Pat. No. 7,608,813 (the '813 patent), which is incorporated herein by reference in its entirety. Similar encoders may utilize self-images generated according to Lau effect principles, in two or three grating encoder arrangements. One example is disclosed in the paper "Optical Encoder Based on the Lau Effect" by Crespo et al., March 2000, Opt. Eng. 39(3), 817-824. Other optical encoders may utilize moiré imaging techniques. An exemplary optical encoder utilizing moiré imaging techniques is disclosed in U.S. Pat. App. No. US20130161499A1 which is incorporated herein by reference in its entirety.

Typical encoder configurations such as those disclosed in the '813 patent rely on an illumination grating with a fixed pitch, and thus cannot utilize interchangeable illumination portion components for different pitches of illumination gratings. In various encoder configurations it is desirable to provide a compact readhead which may be manufactured in a cost efficient manner with simple and interchangeable components.

SUMMARY

An illumination portion for an optical encoder is disclosed. The optical encoder comprises the illumination portion, a scale grating extending along a measuring axis direction and arranged to receive light from the illumination portion, and a detector configuration arranged to receive light from the scale grating. The illumination portion comprises an addressable light source array. The addressable light source array comprises individual sources arranged along the measuring axis direction. The addressable light source array is configured to provide at least first and second addressable sets of the individual sources.

In various embodiments, a method is provided for providing first and second optical position encoders. The method comprises: providing a first optical encoder which comprises a first scale grating extending along a measuring axis direction, a detector configuration, and a first instance of a first illumination portion configuration comprising an addressable light source array which comprises individual sources arranged along the measuring axis direction and which is configured to provide at least a first addressable set and a second addressable set of the individual sources; providing a second optical encoder which comprises a second scale grating different than the first scale grating, a detector configuration, and a second instance of the first illumination portion configuration; and operating the first instance of the first illumination portion configuration to illuminate the first scale grating using the first addressable set of the individual sources in the first optical encoder and operating the second instance of the first illumination portion configuration to illuminate the second scale grating using the second addressable set of the individual sources in the second optical encoder.

In various embodiments, a method for operating an optical position encoder is provided. The method comprises: providing an optical encoder which comprises a scale grating extending along a measuring axis direction, a detector configuration, and an illumination portion comprising an addressable light source array which comprises individual sources arranged along the measuring axis direction, and which is configured to provide at least a first addressable set and a second addressable set of the individual sources; and operating the illumination portion to illuminate the scale grating using an operational set of the individual sources which includes less than the an entirety of the addressable light source array.

BRIEF DESCRIPTION OF THE DRAWINGS

The foregoing aspects and many of the attendant advantages will become more readily appreciated as the same become better understood by reference to the following detailed description, when taken in conjunction with the accompanying drawings, wherein.

DETAILED DESCRIPTION

Figure 1:
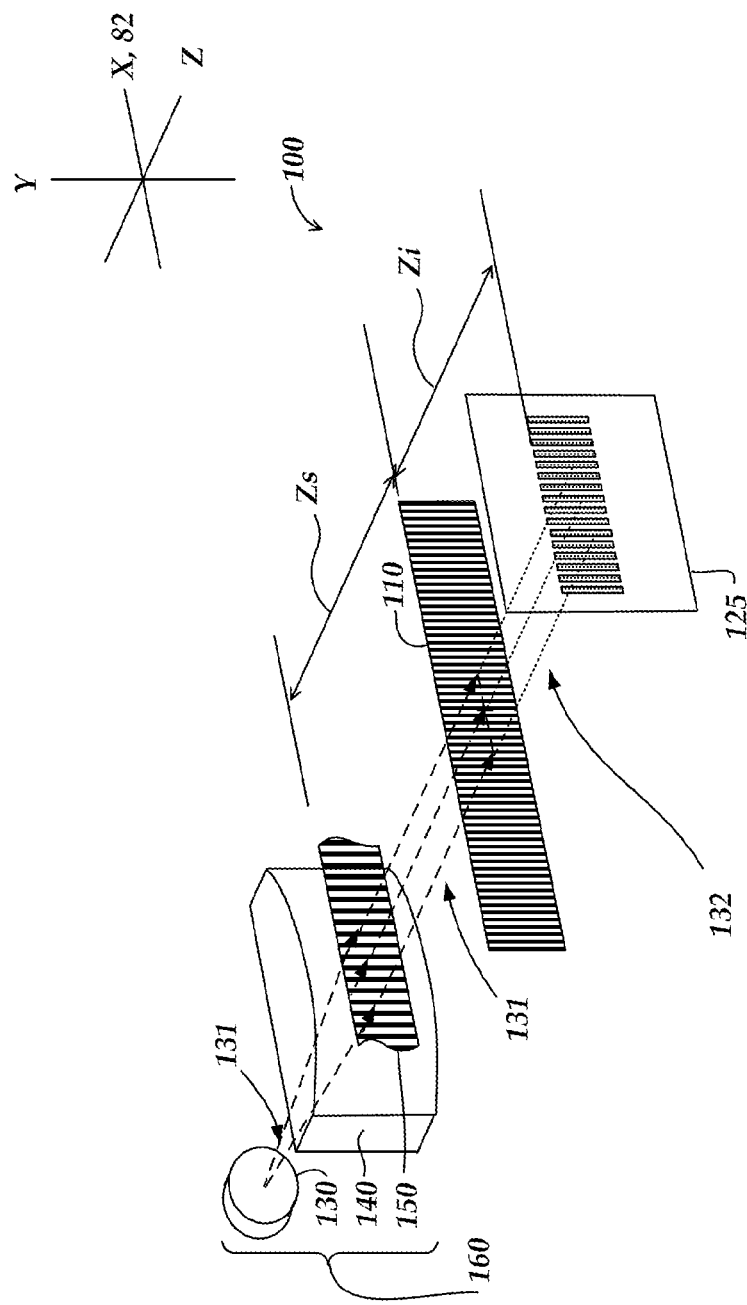
FIG. 1 is a partially schematic exploded diagram of a prior art optical self-imaging encoder configuration.

FIG. 1 is a partially schematic exploded diagram of a prior art optical self-imaging encoder configuration 100. Certain aspects of the encoder configuration 100 are similar to encoder configurations described in the '813 patent and may be understood by analogy. As shown in FIG. 1, the encoder configuration 100 includes a scale grating 110, an illumination portion 160 and a detector configuration 125. The illumination portion 160 comprises a light source 130, a lens 140 and an illumination grating 150. The scale grating 110 is separated from the illumination portion 160 by a source gap distance Zs. The detector configuration 125 is separated from the scale grating 110 by a distance Zi. In some embodiments, the light source 130 is an LED.

FIG. 1 shows orthogonal X, Y, and Z directions, according to a convention used herein. The X and Y directions are parallel to the plane of the scale grating 110, with the X direction parallel to the intended measuring axis direction MA 82 (e.g., perpendicular to elongated pattern elements of the scale grating 110). The Z direction is normal to the plane of the scale grating 110.

In operation, light 131 emitted from the light source 130 is partially or fully collimated by the lens 140, over a beam area sufficient to illuminate the scale grating 110. The light 131 passes through the grating structure of the illumination grating 150 to provide an array of partially coherent illumination sources at the grating openings, selected to illuminate the scale grating 110 according to known self-imaging illumination principles. When the scale grating 110 is illuminated, it outputs a spatially modulated light pattern (e.g., interference fringe light from diffracted orders, in some embodiments) as scale light 132 to the detector configuration 125. The encoder configuration 100 is configured according to known methods such that several diffracted orders interact to produce a self-image (e.g., a Talbot image or a Fresnel image) at the plane of the detector configuration 125.

In various applications, the detector configuration 125 and the illumination portion 160 are mounted in a fixed relationship relative to one another, e.g., in a readhead or gauge housing (not shown), and are guided along the measuring axis relative to the scale grating 110 by a bearing system, according to known techniques. The scale grating 110 may be attached to a moving stage, or a gauge spindle, or the like, in various applications. The configuration shown in FIG. 1 is a transmissive configuration. The scale grating 110 comprises light blocking portions and light transmitting portions (e.g., fabricated on a transparent substrate using known thin-film patterning techniques, or the like) that output the spatially modulated light patterns to the detector tracks by transmission. It will be appreciated that similar components may be arranged in reflective embodiments, wherein the illumination portion 160 and the detector configuration 125 are arranged on the same side of the scale grating 110, and positioned for angled illumination and reflection if necessary, according to known techniques.

It should be appreciated that the encoder configuration 100 may be utilized in a Lau effect encoder configuration. In some embodiments incorporating a Lau effect encoder configuration, the lens 140 may be eliminated, as such configurations do not require a highly collimated light source.

Figure 2:
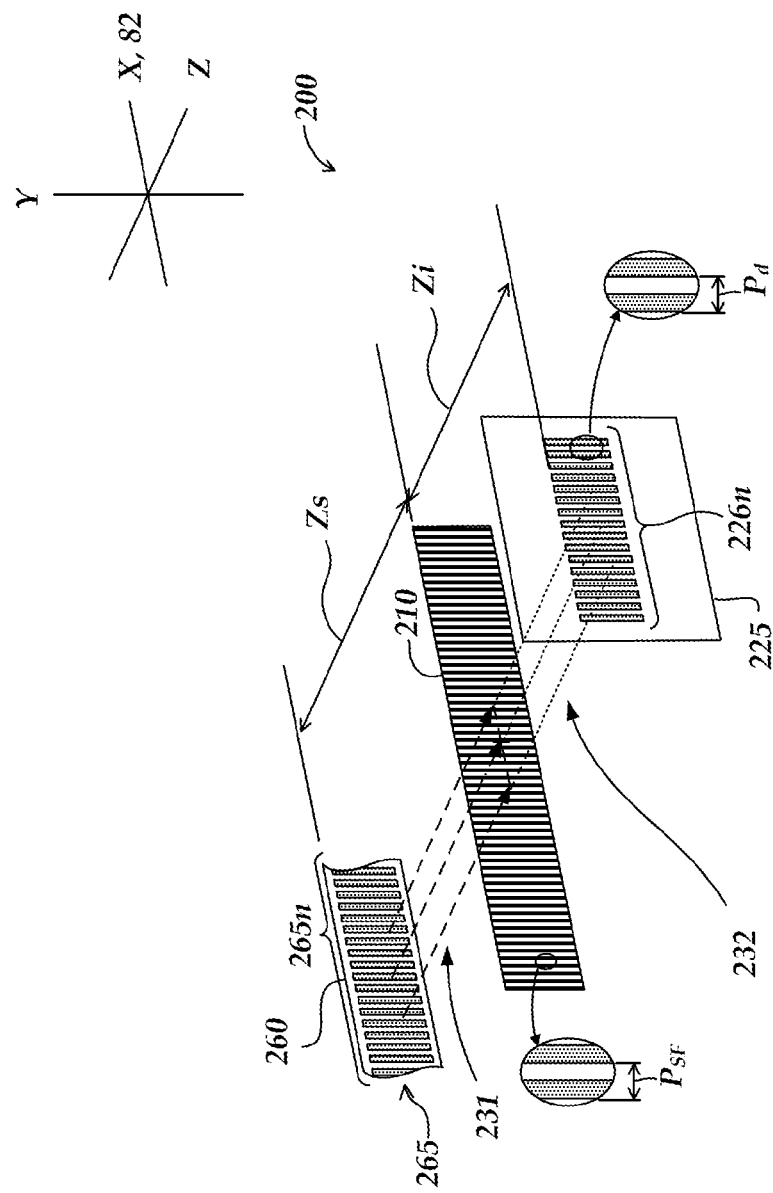
FIG. 2 is a partially schematic exploded diagram of an optical self-imaging encoder configuration.

FIG. 2 is a partially schematic exploded diagram of an optical self-imaging encoder configuration 200. Elements of the encoder configuration 200 numbered 2XX are similar or identical to elements numbered 1XX in FIG. 1 and may be understood by analogy. As shown in FIG. 2, the encoder configuration 200 includes a scale grating 210, an illumination portion 260 and a detector configuration 225. The illumination portion 260 comprises an addressable light source array 265. The addressable light source array 265 comprises individual sources 265n arranged along the measuring axis direction 82. In some embodiments, the individual sources 265n may be LED sources. The scale grating 210 extends along the measuring axis direction 82 and is arranged to receive light 231 from the illumination portion 260. The scale grating comprises a scale pitch $P_{SF}$. The scale grating 210 is separated from the illumination portion 260 by a source gap distance Zs. The detector configuration 225 is separated from the scale grating 210 by a distance Zi and is arranged to receive light 232 from the scale grating 210. The detector configuration 225 comprises detector portions 226n which are arranged according to a detector pitch Pd which corresponds to a pitch of the spatially modulated light 232. The optical encoder 200 includes no light blocking element between the addressable light source array 265 and the scale grating 210.

As will be shown in FIGS. 3A-3C, 4, 5 and 6A-6C, in various embodiments, the addressable light source array 265 comprises at least a first addressable set and a second addressable set of the individual sources 265n.

In some embodiments, the individual sources 265n may include LEDs configured with a strip shape elongated along a direction transverse to the measuring axis direction and having a narrow dimension along the measuring axis direction, and reflective elements proximate to a substrate of the LEDs. Exemplary individual sources which may be suitable for the illumination portion 260 are manufactured by Infini-LED of Cork, Ireland. It should be appreciated that each of the individual sources 265n may be a continuous strip-like source or may be constructed with point sources (e.g., micro LEDs) arranged in a strip-shaped zone.

While the optical self-imaging encoder configuration 200 is a transmissive type of encoder configuration, it should be appreciated that the illumination portion 260 may be suitably adapted to a reflective type of encoder configuration. Additionally, the illumination portion 260 may also be suitably adapted to a moiré imaging type of encoder configuration, such as that disclosed in U.S. Pat. App. No. US20130161499A1.

Figure 3A:
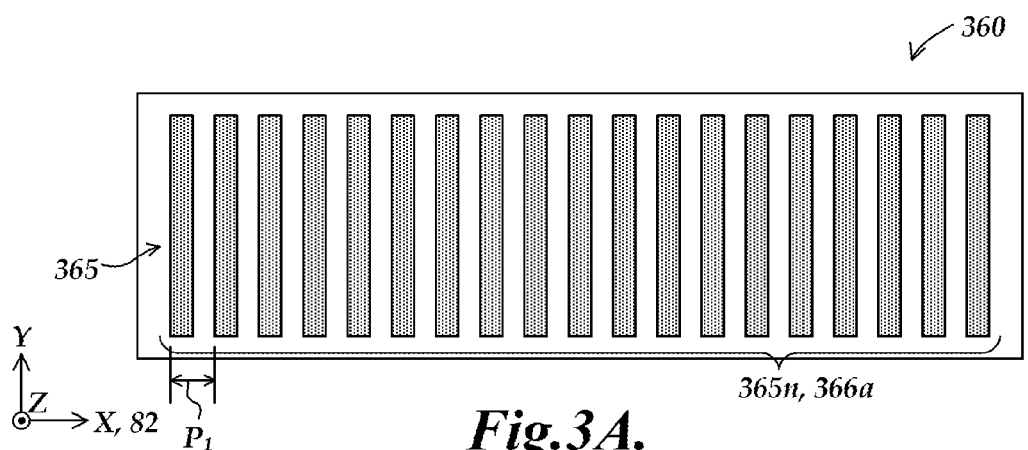
FIGS. 3A-3C are a diagrams of an embodiment of an illumination portion for an optical encoder.
Figure 3B:
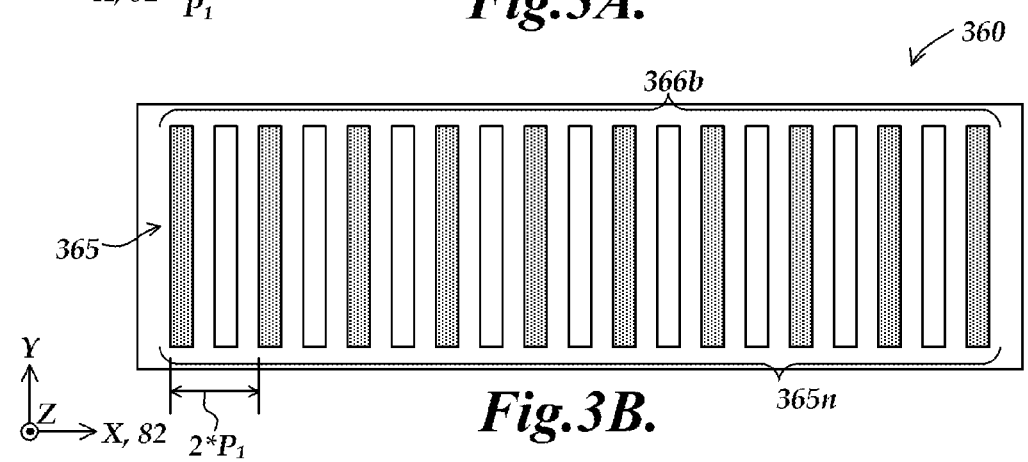
Figure 3C:
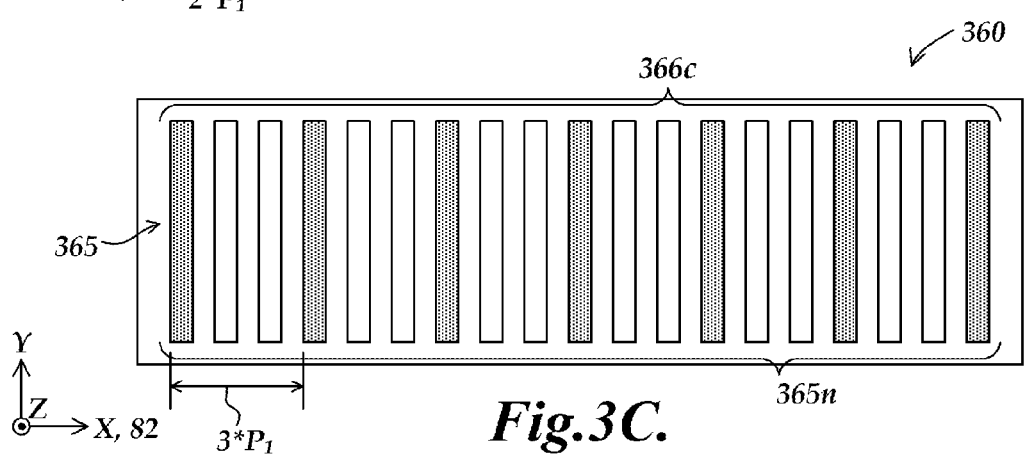

FIGS. 3A-3C are diagrams of an embodiment of an illumination portion 360 for an optical encoder showing three exemplary states. The illumination portion 360 is similar to the illumination portion 260 and may be incorporated in the encoder configuration 200. The illumination portion 360 comprises an addressable light source array 365. The addressable light source array 365 comprises individual sources 365n arranged along the measuring axis direction MA, 82.

In the embodiment shown in FIG. 3A, each of the individual sources 365n is activated as a first addressable set 366a, as indicated by a fill pattern. In this state, the activated individual sources are located according to an illumination pitch $P_1$.

In the embodiment shown in FIG. 3B, a second addressable set 366b of the individual sources 365n is activated, as indicated by a fill pattern. In this state, the second addressable set 366b is a subset of individual sources of the addressable light source array 365 which are located according to an illumination pitch $2*P_1$.

In the embodiment shown in FIG. 3C, a third addressable set 366c of the individual sources 365n is activated, as indicated by a fill pattern. In this state, the third addressable set 366c is a subset of individual sources of the addressable light source array 365 which are located according to an illumination pitch $3*P_1$.

In the embodiments shown in FIGS. 3A-3C, the illumination portion 360 may be arranged in an optical encoder which is not shown (e.g., the encoder configuration 200). The illumination portion 360 may be configured to use an operational set of the individual sources 365n (e.g., one of the first, second and third addressable sets 366a, 366b or 366c). The individual sources of an operational set may be periodically spaced according to an illumination pitch $P_{MI}$ along the measuring axis direction. The scale grating 210 may have a scale pitch $P_{SF}$ along the measuring axis direction. A detector configuration (e.g., the detector configuration 225 of FIG. 2) may comprise a set of optical detector portions having a detector pitch $P_d$ along the measuring axis direction 82 which match a pitch of self-image fringes located at a plane proximate to the detector configuration.

For each of the sets of the individual sources 366a, 366b and 366c, the illumination pitch $P_{MI}$ satisfies the expression $$P_{MI}=P_d*P_{SF}/(P_d-P_{SF}).\qquad\text{Eq. 1.}$$

The illumination portion 360 offers the advantage of a reduced number of elements in an encoder readhead, providing a more compact single element for an illumination portion, rather than a light source, lens and illumination grating such as the light source 130, the lens 140 and the illumination grating 150 of the illumination portion 160 shown in FIG. 1. This reduces manufacturing costs when manufacturing encoders with a variety of parameters such as scale pitch. In various encoder configurations, the illumination pitch $P_{MI}$ of an addressable set of individual sources may be selected according to a combination of values for the detector pitch $P_d$ and the scale pitch $P_{SF}$ as expressed in Eq. 1.

The source gap distance Zs and the distance Zi shown in FIG. 2 also depend on the values in Eq. 1. In some embodiments, the illumination portion 260 outputs light with a wavelength λ and Zs satisfies the expression $$Zs=2*P_{MI}*P_{SF}/\lambda.\qquad\text{Eq. 2.}$$

In some embodiments, the distance Zi satisfies the expression $$Zi=Z_S*P_{SF}/(P_{MI}-P_{SF}).\qquad\text{Eq. 3.}$$

In an exemplary embodiment for a state of the illumination portion 360, individual sources of the first addressable set 366a may be located according to a value of the illumination pitch $P_1$ which is 24 μm. The scale pitch $P_{SF}$ may be 8 μm, the detector pitch $P_d$ may be 12 μm, the source gap may be 948 μm and the distance Zi may be 474 μm. In another exemplary embodiment for a state of the illumination portion 360, individual sources of the second addressable set 366b may be located according to a value of the illumination pitch $2*P_1$ which is 48 μm. The scale pitch $P_{SF}$ may be 20 μm, the detector pitch $P_d$ may be 34.3 μm, the source gap may be 4.74 mm and the distance Zi may be 3.39 mm.

It should be appreciated that in some embodiments, the sets of individual sources 366a, 366b and 366c may comprise individual sources which are individually addressable. However, in other embodiments, the sets of individual sources 366a, 366b and 366c may only be addressable as a group, i.e., they may be connected to one another by conductors, or programmable switches, and addressed together through the same input for simplicity.

It should be appreciated that in alternative embodiments, an illumination portion may be constructed which comprises two sets of addressable individual sources arranged at different pitches by interleaving the two sets. This may be advantageous in that it allows for two pitches which are not integer multiples of a single value, as opposed to the pitches of the sets of individual sources 366a, 366b and 366c.

Figure 4:
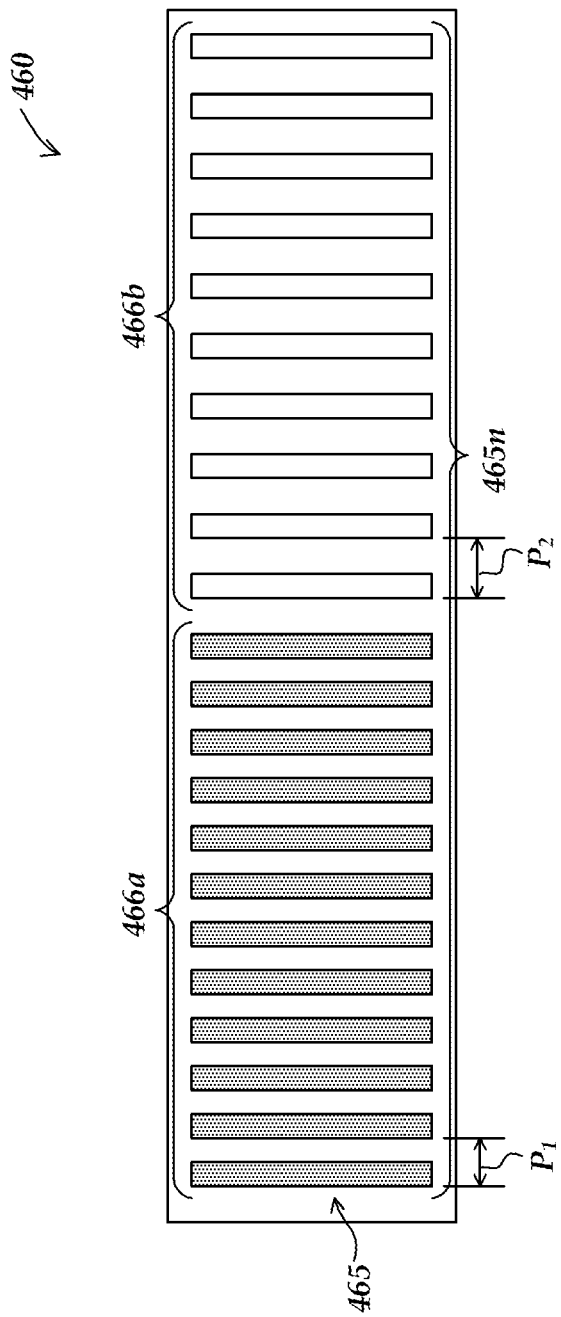
FIG. 4 is a diagram of an embodiment of an illumination portion for an optical encoder.

FIG. 4 is a diagram of an embodiment of an illumination portion 460 for an optical encoder. The illumination portion 460 is similar to the illumination portion 260. The illumination portion 460 comprises an addressable light source array 465. The addressable light source array 465 comprises individual sources 465n arranged along the measuring axis direction 82. The addressable light source array is configured to provide a first addressable set 466a of the individual sources 465n and a second addressable set 466b of the individual sources 465n. The first addressable set 466a comprises individual sources located according to an illumination pitch $P_1$. The second addressable set 466a comprises individual sources located according to an illumination pitch $P_2$.

In the state shown in FIG. 4, the first addressable set 466a is shown with individual sources which are activated, as indicated with a fill pattern, and the second addressable set 466b is shown with individual sources which are not activated, as indicated by an absence of a fill pattern. In this state, the illumination portion 460 is configured for use with a first encoder configuration. Alternatively, in another state, the second addressable set 466b may be activated while the first addressable set 466a is not activated, in order to configure the illumination portion 460 for use with a second encoder configuration which requires illumination with a different pitch. It should be appreciated that the illumination portion 460 should be aligned with a detector configuration such that whichever addressable set of individual sources is used in the encoder configuration is centered with respect to the detector configuration.

Figure 5:
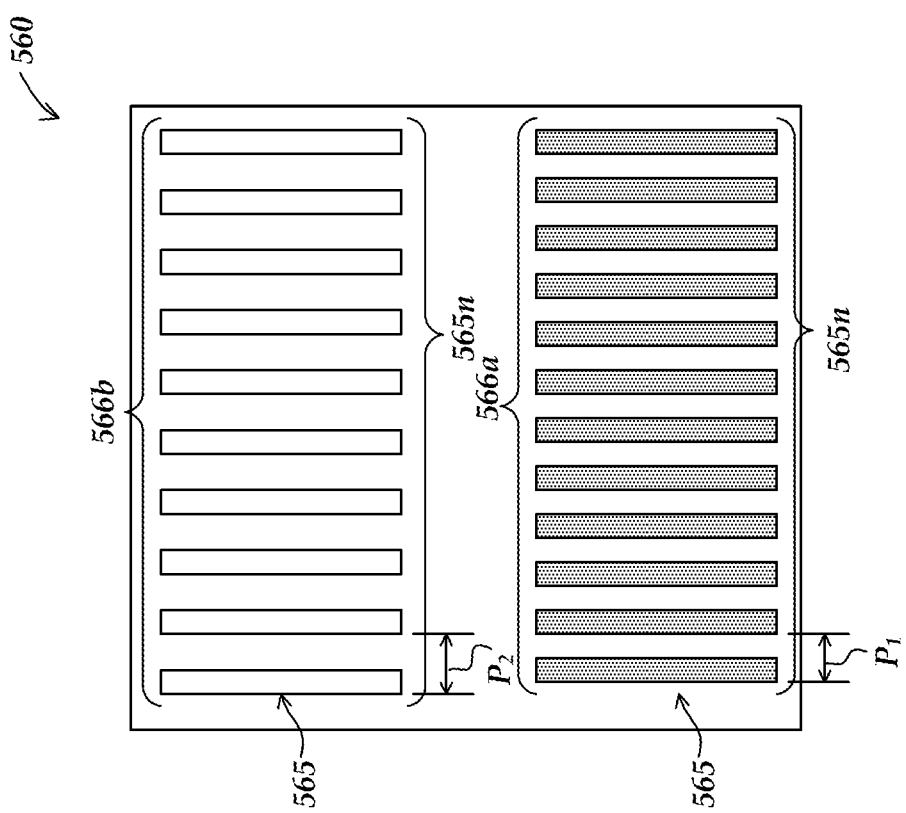
FIG. 5 is a diagram of an embodiment of an illumination portion for an optical encoder.

FIG. 5 is a diagram of an embodiment of an illumination portion 560 for an optical encoder. The addressable light source array 565 comprises individual sources 565n arranged along the measuring axis direction 82. The illumination portion 560 is analogous to the illumination portion 260, but it is configured for use in a multi-track encoder system comprising a first scale grating and a second scale grating having different scale grating pitches. The illumination portion 560 comprises an addressable light source array 565. The addressable light source array 565 comprises individual sources 565n arranged along the measuring axis direction 82. The addressable light source array is configured to provide a first addressable set 566a of the individual sources 565n and a second addressable set 566b of the individual sources 565n. The first addressable set 566a comprises individual sources located according to an illumination pitch $P_1$. The second addressable set 566b comprises individual sources located according to an illumination pitch $P_2$.

In the state shown in FIG. 5, the first addressable set 566a is shown with individual sources which are activated, as indicated with a fill pattern, and the second addressable set 566b is shown with individual sources which are not activated, as indicated by an absence of a fill pattern. In this state, the illumination portion 560 is configured for use with the first scale grating. In another state, the second addressable set 566b may be activated for use with the second scale grating. The illumination portion 560 may be operated to provide illumination for the first and second scale grating, e.g., time modulated, or simultaneously depending on the optical layout of the encoder configuration.

Figure 6A:
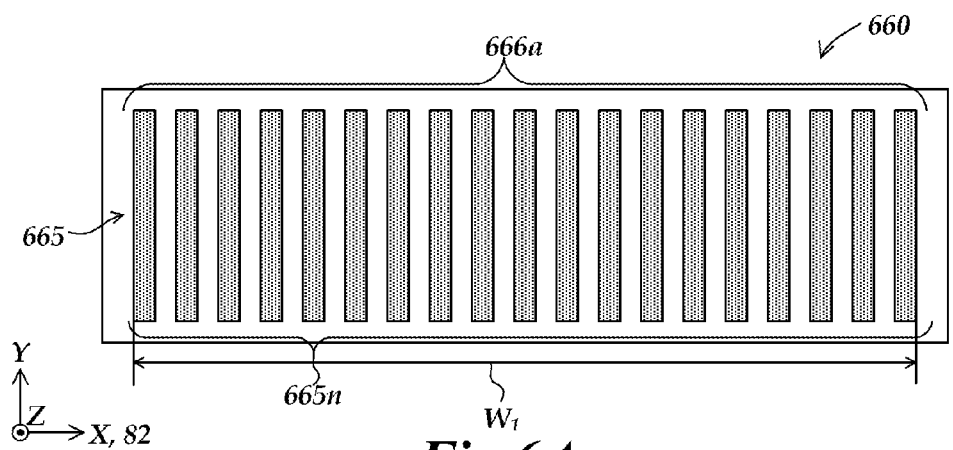
FIGS. 6A-6C are diagrams of an embodiment of an illumination portion for an optical encoder.
Figure 6B:
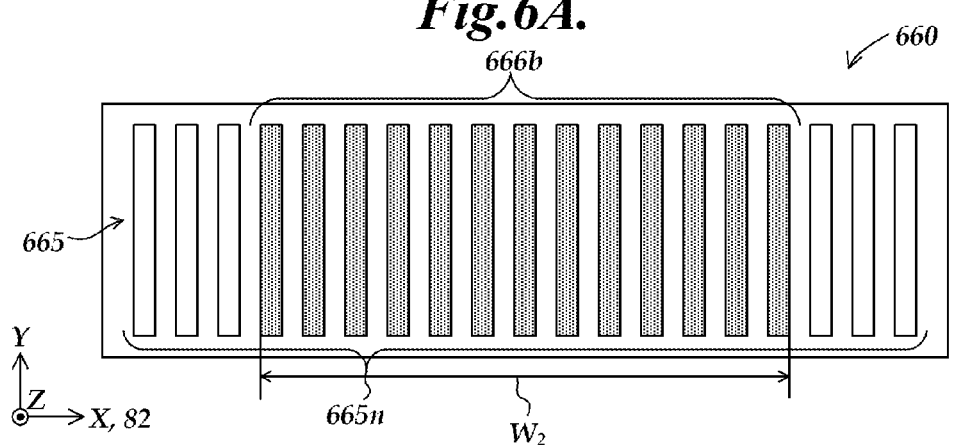
Figure 6C:
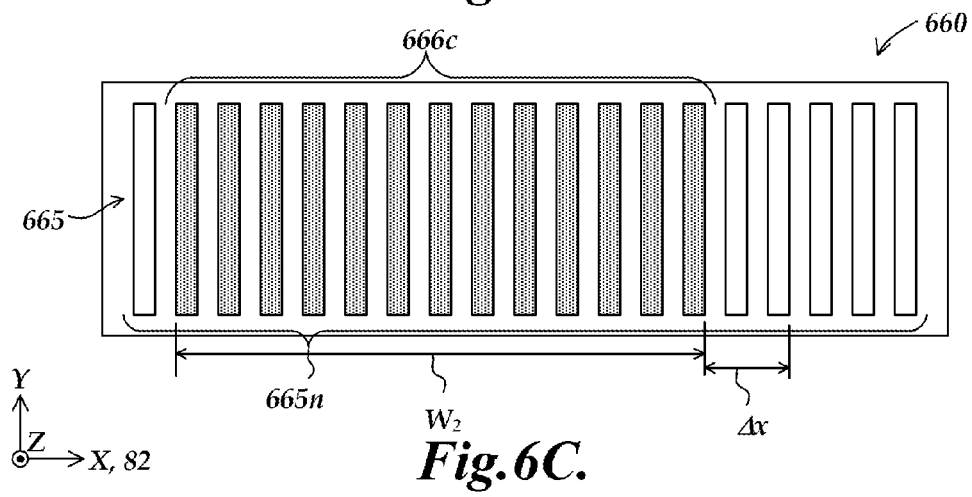

FIGS. 6A-6C are diagrams of an embodiment of an illumination portion 660 for an optical encoder showing three exemplary states. The illumination portion 660 is arranged in an optical encoder which is not shown. The illumination portion 660 is similar to the illumination portion 260. The illumination portion 660 comprises an addressable light source array 665. The addressable light source array 665 comprises individual sources 665n arranged along the measuring axis direction 82. The illumination portion 660 is configured in one state to use the entirety of the individual sources 665n, and in other states to use an operational set of the individual sources 665n which is approximately centered relative to the detector configuration along the measuring axis direction and which excludes at least one individual source proximate to an end of the addressable light source array.

In the embodiment shown in FIG. 6A, each of the individual sources 665n is activated as a first operational set 666a, as indicated by a fill pattern. In this state, the activated individual sources of the first operational set 666a are located within a dimension $W_1$ which corresponds to a dimension of a field of view of a detector configuration along the measuring axis direction 82.

In the embodiment shown in FIG. 6B, a second operational set 666b of the individual sources 665n is activated, as indicated by a fill pattern. In this state, the second operational set 666b is a subset of individual sources of the addressable light source array 665 which are located within a dimension $W_2$ which corresponds to a dimension of a field of view of a detector configuration along the measuring axis direction 82. The dimension $W_2$ is smaller than the dimension $W_1$ shown in FIG. 6A. Thus, as will be described in more detail below, the state shown in FIG. 6B is more suitable for a detector configuration with a smaller field of view than that of FIG. 6A because a self-image provided by an encoder configuration utilizing this state of the illumination portion 660 will have a smaller dimension along the measuring axis direction which more efficiently covers the detector configuration while eliminating or reducing stray light from a portion of the self-image which is outside of the detector configuration. This offers the advantage of lower power consumption in such an encoder configuration. The illumination portion 660 may therefore be used in a variety of encoder configurations with detector configurations having differing sizes of a field of view along the measuring axis direction 82 which may also reduce manufacturing costs in producing a variety of configurations. Conventional encoder configurations utilizing moiré imaging techniques require a larger source gap distance in order to fill a larger field of view of a detector configuration. The illumination portion 660 allows for the capability to fill a larger field of view of a detector configuration with a smaller source gap distance.

In the embodiment shown in FIG. 6C, a third operational set 666c of the individual sources 665n is activated, as indicated by a fill pattern. In this state, the third operational set 666c is a subset of individual sources of the addressable light source array 665 which are located within a dimension $W_2$, which is the same size as the operational set 666b shown in FIG. 6B. The operational set of the individual sources 666c is located off center relative to the addressable light source array. More specifically, the activated individual sources in FIG. 6C are offset by a value $\Delta x$ along the measuring axis direction relative to the "centered" position of the second operational set 666b shown in FIG. 6B. Assembly costs may be reduced as sets of the individual sources may be activated or deactivated along the measuring axis direction as necessary to correct alignment with respect to a detector configuration in lieu of mechanically aligning the entire illumination portion 660 during assembly.

Figure 7:
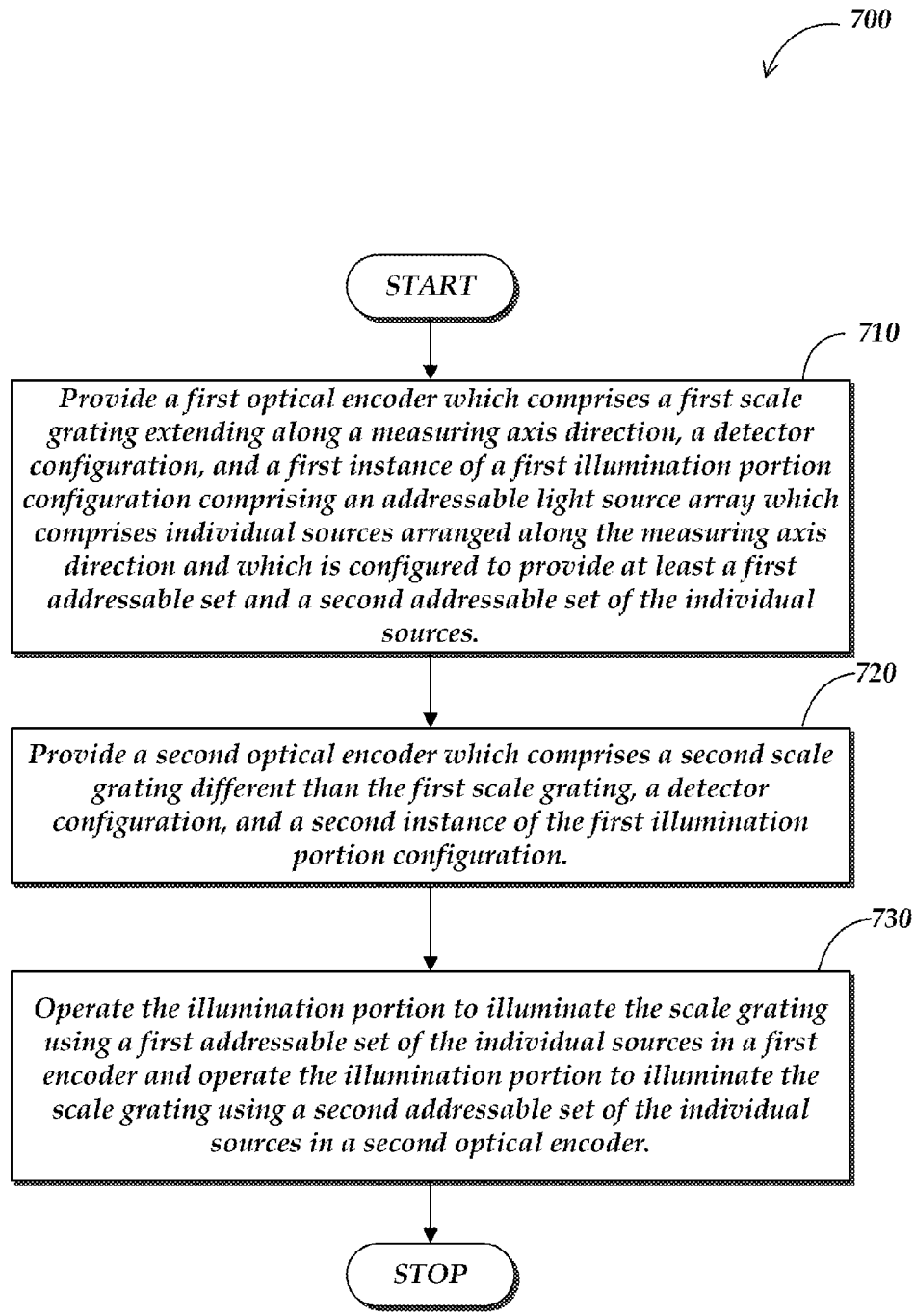
FIG. 7 is a flow diagram of a method for operating an optical encoder.

FIG. 7 is a flow diagram 700 of a method for operating an optical encoder. At a block 710, a first optical encoder is provided which comprises a first scale grating extending along a measuring axis direction, a detector configuration, and a first instance of a first illumination portion configuration comprising an addressable light source array which comprises individual sources arranged along the measuring axis direction and which is configured to provide at least a first addressable set and a second addressable set of the individual sources. At a block 720, a second optical encoder is provided which comprises a second scale grating different than the first scale grating, a detector configuration, and a second instance of the first illumination portion configuration. At a block 730, a first instance of the first illumination portion configuration operated to illuminate the first scale grating using the first addressable set of the individual sources in the first optical encoder and the second instance of the first illumination portion configuration is operated to illuminate the second scale grating using the second addressable set of the individual sources in the second optical encoder. For example, the illumination portion 360 may be operated in a first encoder requiring an illumination pitch $P_1$ using the first set of addressable individual sources 366a and it may be operated in a second encoder requiring an illumination pitch $2*P_1$ using the second set of addressable individual sources 366b. As another example, the illumination portion 660 may be operated in a first encoder requiring a field of view corresponding to illumination with a width $W_1$ provided by the first addressable set of individual sources 666a, and it may be operated in a second encoder requiring a field of view corresponding to illumination with a width $W_2$ provided by the second addressable set of individual sources 666b.

In some embodiments, the first scale grating of the first optical encoder may be spaced at a first distance $Z_1$ from the detector configuration along a direction transverse to the measuring axis direction, and the second scale grating of the second optical encoder may be spaced at a second distance $Z_2$ from the detector configuration along a direction transverse to the measuring axis direction. In some embodiments, the source gap distance may vary between the first and second optical encoders as well.

In some embodiments, the first and second optical encoders may include no light blocking element between their addressable light source array and their scale grating.

Figure 8:
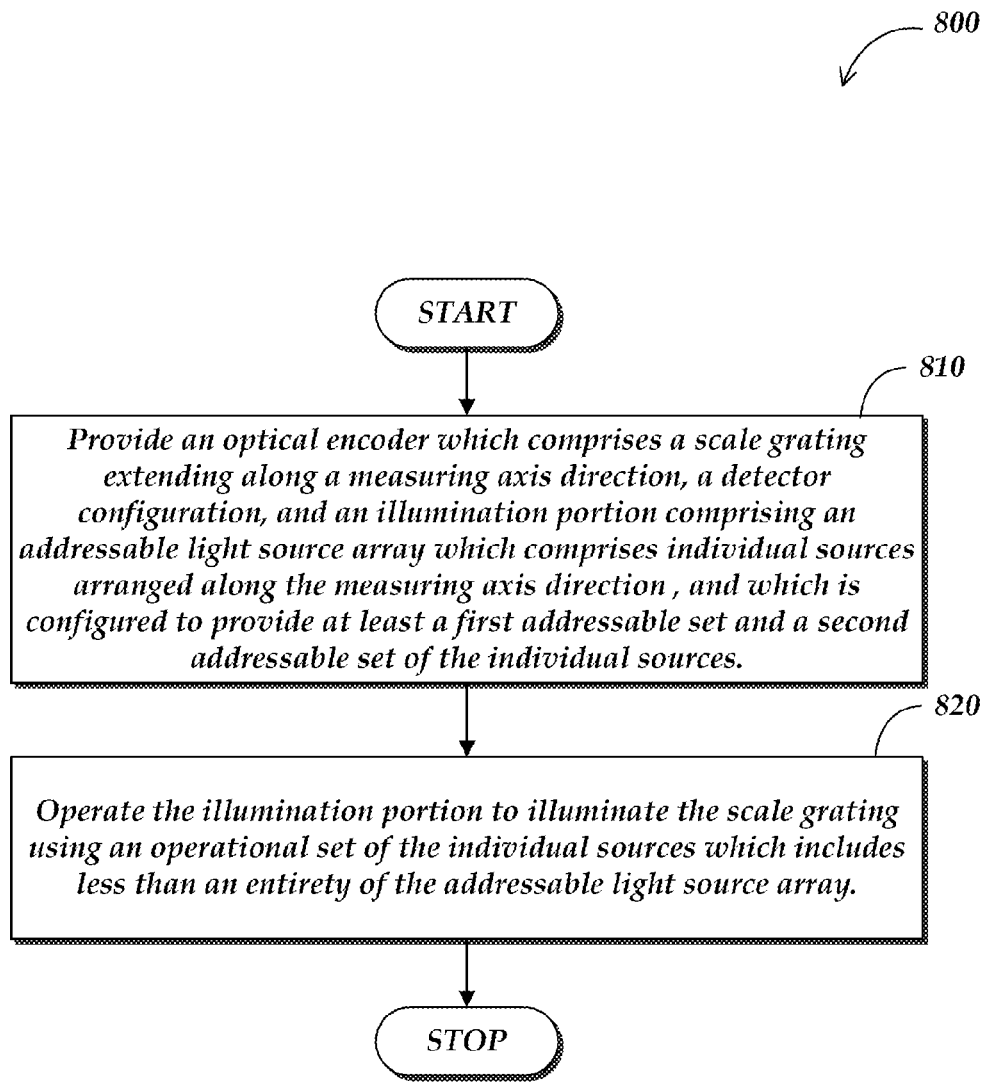
FIG. 8 is a flow diagram of a method for operating an optical encoder.

FIG. 8 is a flow diagram 800 of a method for operating an optical encoder. At a block 810, an optical encoder is provided which comprises a scale grating extending along a measuring axis direction, a detector configuration, and an illumination portion comprising an addressable light source array which comprises individual sources arranged along the measuring axis direction, and which is configured to provide at least a first addressable set and a second addressable set of the individual sources. At a block 820, the illumination portion is operated to illuminate the scale grating using an operational set of the individual sources which includes less than an entirety of the addressable light source array.

In some embodiments, at the block 820, operating the illumination portion using the operational set of the individual sources may comprise adjusting or selecting the operational set of the individual sources to be approximately centered relative to the detector configuration along the measuring axis direction, and to exclude at least one individual source proximate to an end of the addressable light source array. For example, as described with respect to FIG. 6C, the operational set of the individual sources (e.g., the third addressable set 666c) may be activated or deactivated along the measuring axis direction as necessary to correct alignment with respect to a detector configuration in lieu of mechanically aligning the entire illumination portion during assembly.

In some embodiments, at the block 820, the individual sources of the first addressable set and the second addressable set of the individual sources may be arranged according to different illumination pitches, and operating the illumination portion using the operational set of the individual sources may comprise adjusting or selecting the operational set of the individual sources to select an illumination pitch of the individual sources.

While various embodiments have been illustrated and described, numerous variations in the illustrated and described arrangements of features and sequences of operations will be apparent to one skilled in the art based on this disclosure. Thus, it will be appreciated that various changes can be made therein without departing from the spirit and scope of the invention.

The embodiments of the invention in which an exclusive property or privilege is claimed are defined as follows:

1. An illumination portion for an optical encoder which comprises the illumination portion, a scale grating extending along a measuring axis direction and arranged to receive light from the illumination portion, and a detector configuration arranged to receive light from the scale grating, wherein:
the illumination portion comprises an addressable light source array;
at least one of the scale grating or the addressable light source array is configured to move relative to the other along the measuring axis direction;
the addressable light source array comprises individual sources arranged along the measuring axis direction;
the addressable light source array is configured to provide at least first and second addressable sets of the individual sources, the first addressable set including a first plurality of the individual sources arranged along the measuring axis direction, and the second addressable set including a second plurality of the individual sources arranged along the measuring axis direction;
the individual sources of the first addressable set of the individual sources are arranged periodically along the measuring axis direction having a first pitch $P_1$; and
the individual sources of the second addressable set of the individual sources are arranged periodically along the measuring axis direction having a second pitch $P_2$ that is different than the first pitch $P_1$.

2. The illumination portion of claim 1, wherein the first addressable set of individual sources is an entirety of a periodic addressable array of light sources and the second addressable set of individual sources is a subset of the periodic addressable array of light sources.

3. The illumination portion of claim 1, wherein the first addressable set of the individual sources is a subset of a periodic addressable array of light sources and the second addressable set of the individual sources is a subset of the periodic addressable array of light sources.

4. The illumination portion of claim 1, wherein:
the illumination portion is arranged in the optical encoder; and
the illumination portion is configured to use an operational set of the individual sources which includes a plurality of the individual sources arranged along the measuring axis direction and which is approximately centered relative to the detector configuration along the measuring axis direction and which excludes at least one individual source of the individual sources arranged along the measuring axis direction, and the at least one individual source that is excluded is proximate to an end of the addressable light source array.

5. The illumination portion of claim 4, wherein the operational set of the individual sources is located off center relative to the addressable light source array.

6. The illumination portion of claim 1, wherein:
the illumination portion is arranged in the optical encoder; and
the illumination portion is configured to use an operational set of the individual sources, wherein:
the individual sources of the operational set are periodically spaced according to an illumination pitch $P_{MI}$ along the measuring axis direction.

7. The illumination portion of claim 6, wherein the individual sources include LEDs configured with a strip shape elongated along a direction transverse to the measuring axis direction and having a narrow dimension along the measuring axis direction, and reflective elements proximate to a substrate of the LEDs.

8. The illumination portion of claim 6, wherein the scale grating has a scale pitch $P_{SF}$ along the measuring axis direction and the detector configuration comprises a set of optical detector portions having a detector pitch $P_d$ along the measuring axis direction, and the illumination pitch $P_{MI}$ approximately satisfies an expression $P_{MI}=P_d*P_{SF}/(P_d-P_{SF})$.

9. The illumination portion of claim 8, wherein the illumination portion outputs light with a wavelength $\lambda$ and the illumination portion is spaced at a distance Zs from the scale grating along a direction transverse to the measuring axis direction, where the distance Zs satisfies an expression $Zs=2*P_{MI}*P_{SF}/\lambda$.

10. The illumination portion of claim 8, wherein the scale grating is spaced at a distance Zi from the detector configuration along a direction transverse to the measuring axis direction, where the distance Zi satisfies an expression $Zi=Zs*P_{SF}/(P_{MI}-P_{SF})$.

11. The illumination portion of claim 1, wherein the illumination portion is arranged in the optical encoder; and the optical encoder includes no light blocking element between the addressable light source array and the scale grating.

12. A method for providing first and second optical encoders, the method comprising:
providing a first optical encoder which comprises a first scale grating extending along a measuring axis direction, a detector configuration, and a first instance of a first illumination portion configuration comprising an addressable light source array which comprises individual sources arranged along the measuring axis direction and which is configured to provide at least a first addressable set and a second addressable set of the individual sources;
providing a second optical encoder which comprises a second scale grating different than the first scale grating, a detector configuration, and a second instance of the first illumination portion configuration; and
operating the first instance of the first illumination portion configuration to illuminate the first scale grating using the first addressable set of the individual sources in the first optical encoder and operating the second instance of the first illumination portion configuration to illuminate the second scale grating using the second addressable set of the individual sources in the second optical encoder.

13. The method of claim 12, wherein:
the first scale grating of the first optical encoder is spaced at a first distance $Z_1$ from the detector configuration along a direction transverse to the measuring axis direction; and
the second scale grating of the second optical encoder is spaced at a second distance $Z_2$ from the detector configuration along the direction transverse to the measuring axis direction.

14. The method of claim 12, wherein the first and second optical encoders include no light blocking element between their addressable light source array and their scale grating.

15. A method for operating an optical encoder, wherein:

the optical encoder comprises a scale grating extending along a measuring axis direction, a detector configuration, and an illumination portion comprising an addressable light source array which comprises individual sources arranged along the measuring axis direction, and which is configured to provide at least a first addressable set and a second addressable set of the individual sources, the first addressable set including a first plurality of the individual sources arranged along the measuring axis direction periodically at a first pitch $P_1$, and the second addressable set including a second plurality of the individual sources arranged along the measuring axis direction periodically at a second pitch $P_2$ that is different than the first pitch $P_1$; and the method comprises:

operating the illumination portion to illuminate the scale grating so as to image at least a portion of the scale grating onto the detector configuration using an operational set of the individual sources which includes at least two of the individual sources but less than an entirety of the addressable light source array, wherein at least one of the scale grating or the addressable light source array is configured to move relative to the other along the measuring axis direction; and utilizing the detector configuration to detect a position of the detector configuration relative to the scale grating along the measuring axis direction.

16. The method of claim 15, wherein operating the illumination portion using the operational set of the individual sources comprises adjusting or selecting the operational set of the individual sources to be approximately centered relative to the detector configuration along the measuring axis direction, and to exclude at least one individual source proximate to an end of the addressable light source array.

17. The method of claim 15, wherein operating the illumination portion using the operational set of the individual sources comprises adjusting or selecting the operational set of the individual sources to select an illumination pitch of the individual sources.

18. The illumination portion of claim 15, wherein the first addressable set of individual sources is an entirety of a periodic addressable array of light sources and the second addressable set of individual sources is a subset of the periodic addressable array of light sources.

* * * * *